US009856158B2

(12) United States Patent
Mazyar et al.

(10) Patent No.: US 9,856,158 B2
(45) Date of Patent: Jan. 2, 2018

(54) METHODS OF REMOVING FINES AND COARSE PARTICLES FROM OIL SAND TAILINGS

(71) Applicant: Baker Hughes Incorporated, Houston, TX (US)

(72) Inventors: Oleg A. Mazyar, Katy, TX (US); Devesh Kumar Agrawal, Houston, TX (US); Radhika Suresh, Sugar Land, TX (US); Oleksandr V. Kuznetsov, Sugar Land, TX (US); Valery N. Khabashesku, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 162 days.

(21) Appl. No.: 15/002,130

(22) Filed: Jan. 20, 2016

(65) Prior Publication Data

US 2017/0204334 A1    Jul. 20, 2017

(51) Int. Cl.
*C02F 1/52* (2006.01)
*C10G 1/04* (2006.01)
*C02F 1/56* (2006.01)
*C02F 101/20* (2006.01)
*C02F 101/10* (2006.01)
*C02F 103/10* (2006.01)

(52) U.S. Cl.
CPC ............ *C02F 1/52* (2013.01); *C02F 1/5236* (2013.01); *C02F 1/56* (2013.01); *C10G 1/047* (2013.01); *C02F 2101/103* (2013.01); *C02F 2101/20* (2013.01); *C02F 2103/10* (2013.01); *C02F 2305/08* (2013.01); *C10G 2300/805* (2013.01)

(58) Field of Classification Search
CPC ...... C02F 1/52; C02F 1/5236; C02F 2103/10; C02F 2305/08; C10G 1/047
See application file for complete search history.

(56) References Cited

U.S. PATENT DOCUMENTS 8,349,188 B2    1/2013 Soane et al.
8,353,641 B2    1/2013 Berg et al.
(Continued)

OTHER PUBLICATIONS

Kasongo et al., Effect of Clays and Calcium Ions on Bitument Extraction from Athabasca Oil Sands Using Flotation, The Canadia Journal of Chemical Engineering, vol. 78, Aug. 2000, pp. 674-681.
(Continued)

*Primary Examiner* — Renee Robinson
(74) *Attorney, Agent, or Firm* — TraskBritt (57) ABSTRACT

A method of removing fines and coarse particles from tailings comprises forming a slurry comprising water and oil sands and separating bitumen from tailings comprising fines and coarse particles. Functionalized nanoparticles each comprising a core of carbon nitride and functionalized with one or more exposed cationic groups are mixed with the tailings. The functionalized nanoparticles and the fines interact to form agglomerates comprising the functionalized nanoparticles and the fines attached to the one or more exposed cationic groups. The agglomerates are removed from the tailings to form an aqueous solution having suspended therein fewer fines and coarse particles than are suspended within the tailings.

20 Claims, 2 Drawing Sheets

(56) References Cited

U.S. PATENT DOCUMENTS

| | | |
|---|---|---|
| 8,557,123 B2 | 10/2013 | Berg et al. |
| 2009/0206040 A1* | 8/2009 | Berg .................... C02F 1/56 |
| | | 210/728 |
| 2011/0094970 A1* | 4/2011 | Kincaid ............ B01D 21/0012 |
| | | 210/726 |
| 2011/0131873 A1* | 6/2011 | Soane .................... C02F 1/40 |
| | | 44/608 |
| 2012/0067824 A1* | 3/2012 | Berg .................... C02F 1/56 |
| | | 210/666 |
| 2015/0353836 A1 | 12/2015 | Kuznetsov et al. |

OTHER PUBLICATIONS

Neiman et al., Secondary Recovery of Bitumen Using Jameson Downcomers, 44th Annual Canadian Mineral Processors Operators Conference, Jan. 17-19, 2012, pp. 115-124.

\* cited by examiner

METHODS OF REMOVING FINES AND COARSE PARTICLES FROM OIL SAND TAILINGS

TECHNICAL FIELD

Embodiments of the disclosure relate generally to methods of removing fines and coarse particles from tailings with nanoparticles functionalized with one or more terminal cationic functional groups. More particularly, embodiments of the disclosure relate to methods of agglomerating fines and coarse particles that are suspended in tailings with functionalized carbon nitride nanoparticles.

BACKGROUND

Oil sands are known to contain hydrocarbons known as bitumen trapped between individual grains of the oil sands. Water surrounding the grains contains very fine clay particles, fine sand, and silt (referred to in the art as "fines"). The bitumen from the oil sands may be recovered by forming a slurry including the oil sands dispersed in an aqueous solution (e.g., water) that may include caustic (e.g., NaOH) in addition to the water. The slurry is fed into a primary separation vessel (PSV) (e.g., a floatation cell) where the oil sands are aerated. Air is bubbled through a bottom portion of the PSV, such as with a sparger, and aerated bitumen rises to the surface to form a froth that overflows the PSV and is recovered for further treatment. Eventually, the recovered bitumen may be upgraded to crude oil, such as by fluid coking, hydro processing, hydro treating, and reblending.

Gravitational forces cause the sand grains to sink and concentrate at the bottom of the PSV. Middlings, a watery mixture containing suspended fines and bitumen, extend between the froth and the sand layers. The underflow and the middlings are frequently combined and processed in a secondary floatation process (known as a Tailings Oil Recovery (TOR) vessel) to recover any bitumen that may remain in the tailings or in the middlings. The middlings and an underflow from the TOR may be further processed to recover any unrecovered bitumen, or may be discarded as tailings. The middlings and the underflow from the TOR vessel may eventually be sent to a tailings pond. In some instances, the underflow contains mainly coarse sands, which may be pumped to a tailings deposition area.

However, the middlings may include coarse sands, mineral fines, and dissolved metals (e.g., mercury, arsenic, etc.) and are, therefore, not suitable for direct discharge into the environment (e.g., rivers). Thus, the middlings are frequently discharged into a tailings pond where the fines are allowed to settle under gravitational forces. Unfortunately, the fines remain stable in the tailings and may take months to several years to settle. This excessive duration presents issues in the recovery of bitumen from oil sands.

BRIEF SUMMARY

Embodiments disclosed herein include methods of removing fines and dissolved solids from tailings. For example, in accordance with one embodiment, a method of removing fines and coarse particles from tailings formed during recovery of bitumen from oil sands comprises forming a slurry comprising water and oil sands, separating bitumen from tailings in at least one of a primary separation vessel or a secondary separation vessel, the tailings comprising a solution having fines and coarse particles suspended therein, mixing functionalized nanoparticles with the tailings, the functionalized nanoparticles each comprising a core of carbon nitride and functionalized with one or more terminal cationic groups, forming agglomerates comprising the functionalized nanoparticles and at least the fines attached to the one or more terminal cationic groups, and removing the agglomerates from the tailings to form an aqueous solution having suspended therein fewer fines and coarse particles than are suspended within the tailings.

In additional embodiments, a method of removing fines from tailings comprises mixing functionalized nanoparticles each comprising at least one exposed amine functional group on surfaces of a carbon nitride core with tailings including negatively charged fine particles to form a mixture, attaching the negatively charged fine particles to the at least one exposed amine functional group to form agglomerations of the fine particles attached to the functionalized nanoparticles, the agglomerations having a larger diameter than each of the negatively charged fine particles, and separating the agglomerations from the tailings to form a substantially clarified aqueous solution having fewer fines suspended therein than are suspended in the tailings.

In further embodiments, a method of separating fines and dissolved metals from tailings comprises forming a mixture comprising carbon nitride nanoparticles functionalized with one or more terminal cationic groups and tailings including a plurality of fines, coarse particles, and dissolved metals suspended therein, binding at least some of the dissolved metals with a core of the carbon nitride nanoparticles, attaching at least some of the fines of the plurality of fines to the one or more terminal cationic groups to form agglomerations of the carbon nitride nanoparticles, bound dissolved metals, and fines, and settling the agglomerations from the tailings to form an aqueous solution having fewer fines, coarse particles, and dissolved metals suspended therein than are suspended in the tailings.

DETAILED DESCRIPTION

Illustrations presented herein are not meant to be actual views of any particular material, component, or system, but are merely idealized representations that are employed to describe embodiments of the disclosure.

The following description provides specific details, such as material types, compositions, material thicknesses, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional techniques employed in the industry. In addition, the description provided below does not form a complete process flow for removing fines, coarse solids, and dissolved metals from tailings or a tailings pond. Only those process acts and structures necessary to understand the embodiments of the disclosure are described in detail below. A person of ordinary skill in the art will understand that some process components (e.g., pipelines, line filters, valves, temperature detectors, pH meters, flow detectors, pressure detectors, and the like) are inherently disclosed herein and that adding various conventional process components and acts would be in accord with the disclosure. Additional acts or materials to treat tailings or a tailings pond may be performed by conventional techniques.

As used herein, the term "fines" means and includes solids such as very fine clay particles, fine sand, and silt that have a diameter less than about 1 jam, such as less than about 500 nm, less than about 100 nm, or less than about 10 nm. As used herein, the term "coarse particle" means and includes particles that have a diameter larger than a diameter of fines.

As used herein, the term "tailings" means and includes a solution including fines, coarse particles, or a combination thereof suspended in a substantially aqueous solution.

Methods and functionalized nanoparticles as disclosed herein may be used for improving fines settling and dissolved metals removal in mine tailings, such as in tailings and tailings ponds. For example, coarse sands as well as fines in tailings that result from mining and bitumen extraction from oil sands may be removed from the tailings. In some embodiments, functionalized nanoparticles are mixed with the tailings to form agglomerations of the functionalized nanoparticles and the fines, coarse particles, and dissolved metals. In some embodiments, water from the tailings may be reused in the bitumen extraction process (e.g., bitumen floatation). The reused water may be at an elevated temperature and may be used in the floatation process without reheating the purified water. Accordingly, use of the functionalized nanoparticles according to methods disclosed herein may reduce an amount of tailings formed during oil recovery processes (e.g., bitumen extraction from oil sands).

Figure 1:
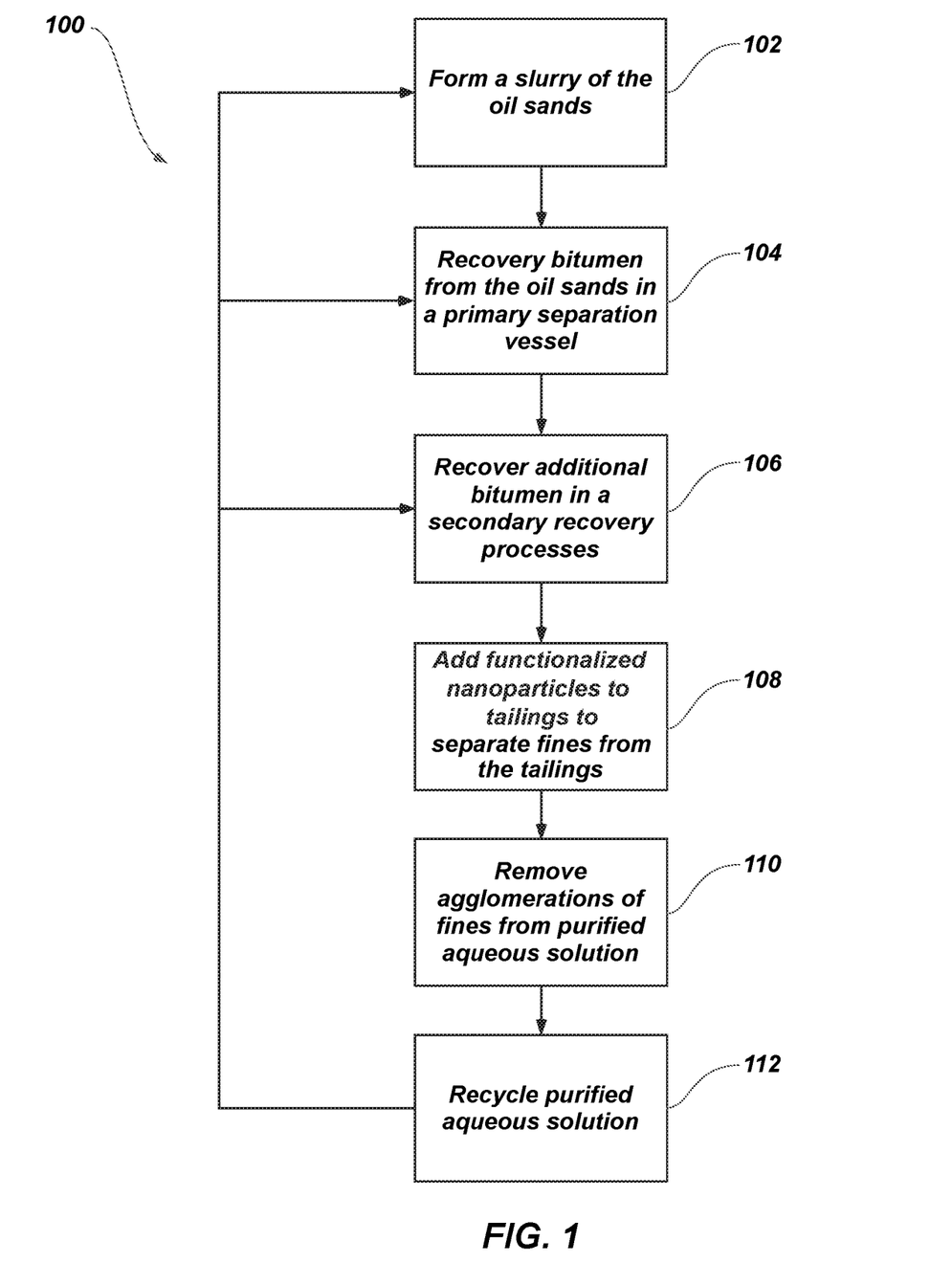
FIG. 1 is a simplified flow diagram depicting a method of removing fines from tailings, in accordance with embodiments of the disclosure.

FIG. 1 is a simplified block diagram illustrating a method 100 of recovering bitumen from oil sands and removing fines and coarse particles from the tailings using functionalized nanoparticles according to an embodiment of the disclosure. The method 100 includes act 102 that includes mixing an aqueous solution with oil sands; act 104 that includes removing bitumen from oil sands in one or more primary separation vessels (PSVs) (e.g., a primary floatation vessel); act 106 including treating middlings and an underflow from the PSV in one or more secondary recovery vessels (e.g., a secondary floatation vessel); act 108 including adding functionalized nanoparticles to the tailings from one or more of the PSVs, the secondary recovery vessels, or a tailings pond to separate fines, coarse particles, and dissolved metals from the tailings and form a substantially purified aqueous solution and agglomerations of the fines, coarse particles, and dissolved metals; act 110 including removing the agglomerations from the substantially purified aqueous solution; and act 112 including recycling at least a portion of the aqueous solution to one or more of a PSV or a secondary recovery vessel.

Act 102 includes mixing an aqueous solution with oil sands to form a slurry. In some embodiments, one or more additives to facilitate separation of bitumen from the oil sands may be added to the slurry. In some such embodiments, sodium hydroxide may be added to the slurry to further improve bitumen recovery.

Act 104 may include separating bitumen from the oil sands. In some embodiments, the slurry may be added to a primary separation vessel (e.g., a primary floatation vessel) and air or another gas may be sparged or otherwise bubbled through a portion of the vessel to aerate and float the bitumen in a floatation process. Since the bitumen is hydrophobic, it may be attracted to surfaces of the bubbles formed during floatation. Accordingly, the aerated bitumen may separate from the oil sands and rise to a top of the PSV, forming a froth, during the floatation process. In some embodiments, the froth spills over the top of the PSV or is skimmed from the surface of aerated fluid and is further processed to recover the bitumen from the froth.

Act 106 includes removing an underflow (e.g., tailings) and middlings from the one or more PSVs and treating the tailings and middlings in one or more secondary recovery vessels to recover additional bitumen therefrom. The one or more second recovery vessels may include one or more of Tailings Oil Recovery (TOR) vessels, stationary settling vessels, floatation cells, Jameson cells, or combinations thereof. In some embodiments, bitumen recovered in the secondary recovery vessel is recycled back to the PSV, where it may be further processed and recovered in the froth.

Tailings from one or more PSVs, one or more secondary recovery vessels, or a combination thereof may include fines, coarse particles, and dissolved metals suspended therein. In some embodiments, a size (e.g., a diameter) of suspended particles within the tailings may exhibit a bimodal distribution. By way of nonlimiting example, the suspended particles may include fines that may be spherical having a size between about 100 nm and about 500 nm, such as between about 100 nm and about 300 nm, or between about 150 nm and about 250 nm. The suspended particles may also include coarse particles or grains that may have a size between about 500 nm and about 1500 nm.

The suspended particles in the tailings may exhibit a zeta potential such that the fines remain substantially stable while suspended in solution and do not exhibit a tendency to flocculate. In some embodiments, the zeta potential of the suspended particles may be between, for example, −10.0 mV and about −30.0 mV, such as between about −15.0 mV and about −25.0 mV. In some embodiments, the zeta potential of the fines is about −25.0 mV.

The fines and coarse particles may be sized and shaped such that they remain dispersed and suspended in the tailings rather than settling due to gravitational forces. In some embodiments, the tailings are contained and stored in a tailings pond where the tailings are allowed to settle via gravitational forces. However, settling of the fines in a tailings pond may take months or even years to occur.

Accordingly, act 108 includes adding functionalized nanoparticles to the tailings or a tailings pond to separate the fines, coarse particles, and dissolved metals from the tailings. Functionalized nanoparticles formulated and configured to interact with one or more of the fines, the coarse particles, and the dissolved metals in the tailings may be mixed with the tailings. Responsive to interacting with the functionalized nanoparticles, one or more of the fines, coarse particles, or the dissolved metals may form a complex with the functionalized nanoparticles and agglomerate and settle under gravitational forces. A substantially purified aqueous solution is formed as the fines, coarse particles, and dissolved metals agglomerate to the functionalized nanoparticles and settle out of solution.

In some embodiments, the tailings are disposed in a tank and the functionalized nanoparticles are added to the tank. The tank may include one or more mixers configured to disperse the functionalized nanoparticles within the tailings and provide intimate contact between the functionalized nanoparticles and the tailings. In other embodiments, the functionalized nanoparticles are dispersed within a tailings pond.

The functionalized nanoparticles may be generally spherical in shape. In some embodiments, the functionalized nanoparticles have a size between about 5 nm and about 100 nm, such as between about 5 nm and about 50 nm, between about 10 nm and about 25 nm, or between about 10 nm and about 20 nm.

The functionalized nanoparticles may be provided at a concentration of about 10 ppm and about 1,000 ppm, such as between about 10 ppm and about 500 ppm, between about 25 ppm and about 350 ppm, between about 50 ppm and about 250 ppm, or between about 100 ppm and about 150 ppm. In some embodiments, the functionalized nanoparticles are provided at a concentration between about 150 ppm and about 350 ppm. In some embodiments, the functionalized nanoparticles may be provided such that the tailings include about one functionalized nanoparticle for about every two fine particles.

Figure 2:
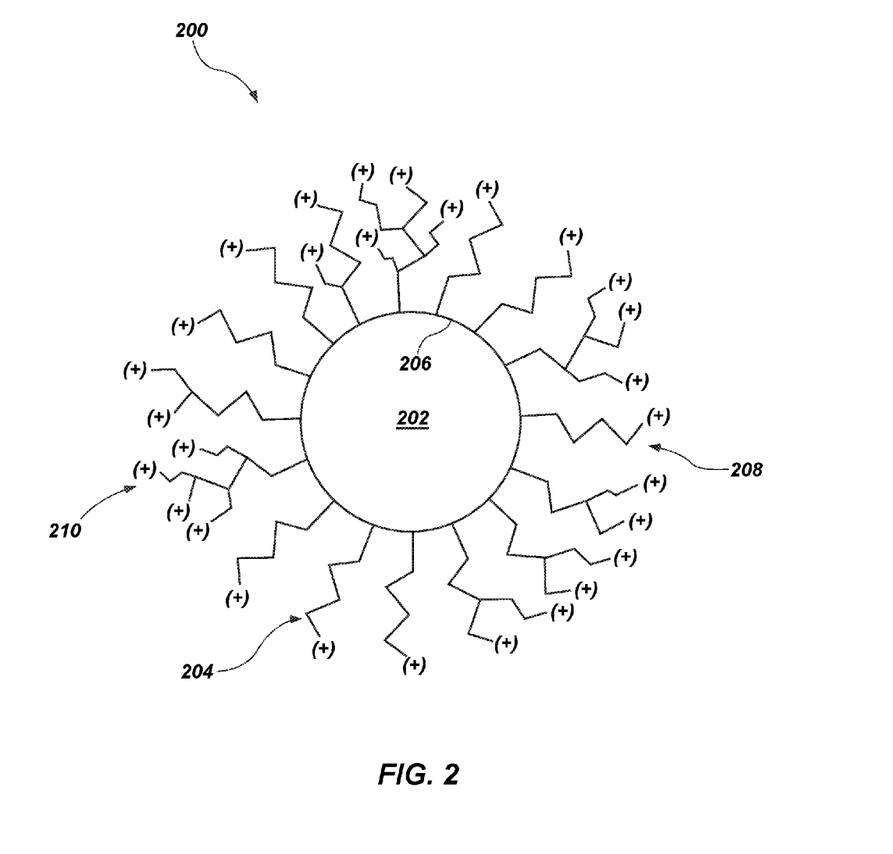
FIG. 2 is a simplified schematic of an embodiment of a functionalized nanoparticle, in accordance with embodiments of the disclosure.

FIG. 2 illustrates a simplified schematic of an embodiment of a functionalized nanoparticle 200 that may be mixed with the tailings. The functionalized nanoparticle 200 may include a core 202 and one or more functional groups 204 attached to a surface 206 thereof. The core 202 may include carbon nitride (e.g., $C_3N_4$), boron carbon nitride, silica, alumina, zirconia, magnesium oxide, nanodiamonds (e.g., carbon nanodiamonds), graphene, graphene oxide, graphite (e.g., nanographite), onion-like carbon structures (e.g., a "bucky onion"), carbon nanotubes (e.g., single-walled carbon nanotubes (SWCNTs), multi-walled carbon nanotubes (MWCNTs), and combinations thereof), fullerenes, metal oxides (e.g., oxides of one or more of iron, titanium, tin, lead, ruthenium, nickel, cobalt, etc.), metal nitrides (e.g., nitrides of one or more of iron, titanium, tin, lead, ruthenium, nickel, cobalt, etc.), metal carbides (e.g., carbides of one or more of iron, titanium, tin, lead, ruthenium, nickel, cobalt, etc.), metal phosphates (e.g., phosphates of one or more of iron, titanium, tin, lead, ruthenium, nickel, cobalt, etc.), metal sulfides (e.g., sulfides of one or more of iron, titanium, tin, lead, ruthenium, nickel, or cobalt), metalloid oxides (e.g., oxides of one or more of germanium, aluminum, boron, silicon, etc.), metalloid nitrides (e.g., nitrides of one or more of germanium, aluminum, boron, silicon, etc.), metalloid carbides (e.g., carbides of one or more of germanium, aluminum, boron, silicon, etc.), metalloid phosphates (e.g., phosphates of one or more of germanium, aluminum, boron, silicon, etc.), metalloid sulfides (e.g., sulfides of one or more of germanium, aluminum, boron, silicon, etc.), or combinations thereof. The core 202 may be generally spherical in shape and may have an average particle diameter of between about 5 nm and about 100 nm, such as between about 5 nm and about 50 nm, between about 10 nm and about 25 nm, or between about 10 nm and about 20 nm.

In some embodiments, the core 202 comprises carbon nitride. The carbon nitride may include a $C_3N_4$ polymer. The $C_3N_4$ may be an amorphous carbon nitride or a graphitic carbon nitride. In one embodiment, the $C_3N_4$ structure is graphitic carbon nitride having a generally spherical shape. Generally, the carbon nitride material may have a chemical structure as shown below, where nitrogen atoms form bridges between adjacent triazine structures.

The carbon nitride of the $C_3N_4$ carbon nitride structure may include s-triazine rings (i.e., 1,3,5-triazine) bridged together by nitrogen atoms between adjacent triazine rings. The geometry of the $C_3N_4$ carbon nitride structure may be substantially spherical, similar to buckminsterfullerene structures. In some embodiments, the $C_3N_4$ structure may exhibit a multi-walled structure having a cage-like structure. Adjacent walls of the multi-walled structure may be separated by between about 3 Å and about 4 Å. In some embodiments, the distance between adjacent walls of the multi-walled structures may be about 3.415 Å. In some embodiments, the core 202 comprises a generally spherical shape with a hollow center and the carbon nitride defined surfaces of the spherical shape.

In some embodiments, the core 202 may be sized, shaped, and configured to bind contaminants in the tailings, such as the dissolved metals. By way of nonlimiting example, the core 202 may comprise carbon nitride. The carbon nitride structure (e.g., a graphitic carbon nitride structure) may inherently include vacancies (e.g., voids) that act as sites for binding metallic cations dispersed in the tailings. For example, the carbon nitride may bind metal cations in the vacancies that are inherently formed in a middle portion of triangular shaped openings formed by nitrogen atoms bridged by adjacent triazine rings. In some embodiments, the cations may bind to an outer wall or layer of the core 202. By way of nonlimiting example, the core 202 may be formulated and configured to bind one or more of dissolved metals such as lead ($Pb^{2+}$, $Pb^{4+}$), mercury ($Hg_2^{2+}$, $Hg^{2+}$), arsenic ($As^{2+}$, $As^{3+}$, $As^{5+}$), nickel ($Ni^{2+}$, $Ni^{4+}$), vanadium ($V^{2+}$, $V^{3+}$, $V^{4+}$, $V^{5+}$), chromium ($Cr^+$, $Cr^{3+}$), cadmium ($Cd^{2+}$), cobalt ($Co^{2+}$, $Co^{3+}$), or other heavy metal cations that are dissolved in the tailings.

The one or more functional groups 204 may be cationic and may include one or more cationic groups. In some embodiments, the cationic groups may be incorporated into the functional groups 204 and a positive charge thereof may not be substantially shielded from other portions of the functional groups 204. In other embodiments, the cationic groups may be terminal (e.g., exposed). The exposed cationic groups may be configured to interact with the suspended fines and coarse particles in the tailings. The functional groups 204 may include one or more substantially linear functional groups 208 and one or more substantially dendritic (e.g., branched) functional groups 210. In some embodiments, the dendritic functional groups 210 may include a branched structure attached to the surface 206 of the functionalized nanoparticle 200, wherein one or more of the branches are terminated by at least one terminal cationic group.

The exposed cationic groups may include positively charged nitrogen, phosphorus, sulfur, or combinations thereof in a heterocyclic compound that may include a 5-membered ring or a 6-membered ring. In some embodiments, the exposed cationic groups may include one or more of an amine group (e.g., —NH$_2$, —NRH, —NR$_2$, where R may comprise similar or different organic groups or hydrogen), a guanidine group, a bi-guanide group, guanidine derivatives, an imidazole group, a pyrazole group, a pyridine group, a piperidine group, a pyrrolidine group, a morpholine group, a quinolone group, an isoquinoline group, an indole group, a thiazole group, a benzothiazole group, a quaternary ammonium group, a phosphonium group (e.g., a quaternary phosphonium group), a sulfonium group (e.g., a tertiary sulfonium group), a guanidinium group, a bi-guanidinium group, an imidazolium group, a pyrazolium group, a pyridinium group, a piperidinium group, a pyrrolidinium group, a morpholinium group, a quinolinium group, an isoquinolinium group, an indolium group, a thiazolium group, a benzothiazolium group, a cyclopropenylium group, an amide group (e.g., one or more of an organic amide, a sulfonamide, or a phosphoramide), polyethyleneimine groups, derivatives thereof, or combinations thereof. In some embodiments, the functional groups 204 may be amine terminated, phosphonium terminated, sulfonium terminated, guanidinium terminated, bi-guanidinium terminated, imidazolium terminated, pyrazolium terminated, pyridinium terminated, piperidinium terminated, pyrrolidinium terminated, morpholinium terminated, quinolinium terminated, isoquinolinium terminated, indolium terminated, thiazolium terminated, benzothiazolium terminated, cyclopropenylium terminated, amide terminated, or combinations thereof. The one or more terminal cationic groups may be attached to the surface 206 of the functionalized nanoparticle 204 with, for example, a —C(=O)—R— linking group that may include one or more additional cationic functional groups. By way of nonlimiting example, the functional group 204 may include one or more exposed terminal amine groups attached to the core 202 via, for example, a —C(=O)—R(—O—CH$_2$CH$_2$—)$_n$ group.

In some embodiments, at least some of the functionalized nanoparticles 200 may include terminal amine groups, and at least some of the functionalized nanoparticles 200 may include one or more of terminal phosphonium, terminal sulfonium, terminal guanidinium, terminal bi-guanidinium, terminal imidazolium, terminal pyrazolium, terminal pyridinium, terminal piperidinium, terminal pyrrolidinium, terminal morpholinium, terminal quinolinium, terminal isoquinolinium, terminal indolium, terminal thiazolium, terminal benzothiazolium, terminal cyclopropenylium, terminal amide groups, derivatives thereof, or combinations thereof.

Where the functionalized nanoparticles 200 comprise terminal amine groups, the terminal amine group may be one or more of primary amines (NH$_2$—R$_1$), secondary amines (NH—R$_1$—R$_2$), tertiary amines (N—R$_1$—R$_2$—R$_3$), or combinations thereof, wherein R$_1$, R$_2$, and R$_3$ each comprise one or more functional groups that may include an alkyl group, an alkenyl group, an alkynyl group, a hydroxyl group, an organohalide, a carbonyl group, an organosulfur group, a carboxyl group, an ester group, an ether group, an epoxy group, a phenolic group, another amine group, a polyamine group, or combinations thereof.

The functionalized nanoparticles 200 may exhibit a zeta potential such that functionalized nanoparticles 200 remain suspended in solution prior to be mixed with the tailings. In some embodiments, the functionalized nanoparticles 200 may be stable when dispersed in the tailings and may be suspended therein. The functionalized nanoparticles 200 may exhibit a zeta potential between about +10.0 mV and about +30 mV, such as between about +15.0 mV and about +25.0 mV. In some embodiments, the zeta potential of the fines is about +25.0 mV, such as about +26.4 mV. An absolute value of the zeta potential of the functionalized nanoparticles 200 may be equal to approximately an absolute value of the zeta potential of the fines dispersed in the tailings stream. In some embodiments, the zeta potential of the functionalized nanoparticles 200 may be positive while the zeta potential of the fines is negative.

Without wishing to be bound by any particular theory, it is believed that the negatively charged fines and coarse particles of the tailings interact with the exposed cationic groups of the functionalized nanoparticles 200, increasing a tendency of the fines and coarse particles to agglomerate with the functionalized nanoparticles 200. The functionalized nanoparticles 200 neutralize surface charges of the fines and coarse particles, destabilizing the fines and coarse particles and allowing them to form agglomerations having a larger size than individual fines or coarse particles that are suspended in the tailings. The agglomerations including the functionalized nanoparticles 200, the fines, and coarse particles have a larger size than the individual fines, increasing a potential for the fines to settle to a bottom of the tailings ponds or tank. In addition, the agglomerations exhibit a zeta potential of about 0 mV, meaning that the agglomerations are not stable as a suspension, but rather, that the agglomerations are more stable when settled. Thus, the agglomerations can be more easily removed from the tailings than the individual fines or coarse particles.

In some embodiments, where the functionalized nanoparticles 200 include a carbon nitride core 202, interaction between metallic cations (and protons) and the carbon nitride core 202 may increase a scavenging ability of the cationic functional groups 204 of the functionalized nanoparticles 200. Without wishing to be bound by any particular theory, it is believed that metallic cations and protons interact with and attach to one of an outer layer or an inner layer of a multi-walled carbon nitride core 202. Accordingly, the core 202 may exhibit a positive charge due to the attached metallic cations and protons. Due to the positive charge exhibited by the core 202, the cationic terminal groups may be repelled by the core 202, causing the functional groups 204 to extend radially from the core 202. Thus, the functional groups 204 may exhibit an increased scavenging ability since the sweep of the functionalized nanoparticles 200 is increased by the repulsion of the terminal cationic groups from the positively charged core 202. Further still, because the core 202 may exhibit a substantially large positive charge, negatively charged fines and coarse particles in the tailings may be attracted to the core in addition to the terminal cationic groups of the functional groups 204. Accordingly, the functionalized nanoparticles 200 may be formulated and configured to bind dissolved metallic cations (e.g., cations of one or more of lead, mercury, arsenic, nickel, vanadium, chromium, cadmium, cobalt, zinc, copper, iron, manganese, molybdenum, titanium, or combinations thereof) as well as fines and coarse solids that are suspended in the tailings.

In some embodiments, the functionalized nanoparticles 200 may be provided as a colloidal suspension of functionalized nanoparticles 200 including a carbon nitride core 202 and amine terminated functional groups 204. The colloidal suspension may be stabilized with one or more surfactants configured to stabilize the suspension and prevent the functionalized nanoparticles 200 from agglomerating and settling. The colloidal suspension may exhibit a zeta potential of about +20 mV and may include between about 0.5 weight percent (0.5 wt. %) and about 5 weight percent functionalized nanoparticles 200, such as between about 0.5 weight percent and about 3 weight percent, or between about 1.0 weight percent and about 2.0 weight percent functionalized nanoparticles 200. In some embodiments, the colloidal suspension includes about 1.0 weight percent carbon nitride nanoparticles. In additional embodiments, the colloidal suspension also includes silica nanoparticles functionalized with one or more functional groups having a terminal cationic functionalization (e.g., an amine termination).

In some such embodiments, the functionalized nanoparticles 200 may have a size between about 15 nm and about 25 nm, such as about 20 nm. The colloidal suspension including functionalized nanoparticles 200 with amine terminated functional groups 204 may be added to the tailings at a concentration such that the resulting mixture of the tailings and the colloidal suspension includes between about 10 ppm and about 1000 ppm of the functional nanoparticles 200. In some embodiments, the tailings include between about 50 ppm and about 350 ppm of the functionalized nanoparticles.

In yet other embodiments, the functionalized nanoparticles 200 may be provided to the tailings as a colloidal suspension stabilized in an acidic solution. The acid may include hydrofluoric acid, although the disclosure is not so limited and the acid may include, for example, hydrofluoric acid or another acid. The colloidal suspension may exhibit a pH between about 4.0 and about 6.0, such as between about 4.5 and about 5.5. The functionalized nanoparticles 200 may exhibit a zeta potential greater than about +40 mV, such as about +42 mV and may have an average diameter of about 40 nm.

In other embodiments, the functionalized nanoparticles 200 may be provided to the tailings as a powder. In some such embodiments, the functionalized nanoparticles 200 may comprise amine terminated carbon nitride powder. The amine terminated carbon nitride powder may exhibit a zeta potential of about +10 mV and may have an average diameter between about 10 nm and about 20 nm. The carbon nitride powder may be added directly to the tailings. In some embodiments, a powder comprising amine terminated silica nanoparticles may further be added to the tailings.

In some embodiments, a flocculent may be added to the tailings. The flocculent may include a high molecular weight anionic polyacrylamine flocculent, such as those sold under the tradename of Magnafloc® by BASF of Ludwigshafen, Germany. The flocculent may be formulated and configured to neutralize a surface charge of the suspended fines and coarse particles and reduce a stability of the suspension. However, the flocculent may undesirably increase a viscosity of the tailings. The increased viscosity may reduce a settling rate of the fines. Accordingly, in some embodiments, the functionalized nanoparticles 200 are added to the tailings to agglomerate the fines prior to addition of the flocculent. After addition of the functionalized nanoparticles 200, the flocculent may be added to the tailings to neutralize surface charges of the fines and reduce a stability of any suspended fines or coarse particles. The flocculent may be added to the tailings such that the flocculent constitutes between about 50 ppm and about 350 ppm of the tailings after addition thereof.

In yet other embodiments, the tailings may be treated with a combination of the functionalized nanoparticles 200 and a coagulant. The coagulant may include a cationic polymer, such as, for example, poly diallyl dimethylammonium chloride (polyDADMAC). The coagulant may enhance precipitation of the fines and coarse particles in the tailings. The mixture of the functionalized nanoparticles 200 and the coagulant may enhance settling more than adding only one of the functionalized nanoparticles 200 or the coagulant. In some embodiments, between about 50 ppm and about 350 ppm of the cationic polymer, such as between about 50 ppm and about 300 ppm, or between about 100 ppm and about 200 ppm is added to the tailings.

In some embodiments, the cationic polymer is mixed with the tailings prior to mixing the functionalized nanoparticles 200 with the tailings. Addition of the functionalized nanoparticles 200 to the tailings after mixing the tailings with the cationic polymer may increase a rate of fines settling. In some embodiments, the fines in the tailings may be settled in a period less than about thirty minutes, such as less than about twenty minutes.

After addition of the functionalized nanoparticles 200 to the tailings, the mixture may be mixed to substantially disperse the functionalized nanoparticles 200 within the tailings and provide sufficient contact between the fines, coarse particles, and dissolved metals dispersed in the tailings and the functionalized nanoparticles.

After addition of the functionalized nanoparticles 200 to the tailings, functionalized nanoparticles 200 may form agglomerations with the fines, coarse particles, and dissolved metals of the tailings. In some embodiments, the agglomerations may have an average diameter at least about five times greater than an average diameter of the coarse particles. In some embodiments, the agglomerations may have an average diameter at least about ten times greater than an average diameter of the coarse particles. The agglomerations may settle to a lower portion of the tailings. Separation of the agglomerations from the tailings may form an aqueous solution having fewer fines and coarse particles suspended therein than are suspended in the tailings. In some embodiments, the aqueous solution may also have less dissolved metals therein than are dissolved in the tailings. In some embodiments, the aqueous solution may be substantially free of fines, coarse solids, and dissolved metals. The aqueous solution may exhibit an improved clarity (e.g., such as determined by turbidity) than the tailings.

With reference again to FIG. 1, act 110 includes removing the agglomerations from the substantially purified aqueous solution. In some embodiments, the agglomerations are transported to a solids treatment or a solids storage facility.

Act 112 may include recycling at least a portion of the substantially purified aqueous solution having fewer fines suspended therein than are suspended within the tailings to one or more of the PSVs or the secondary recovery vessels. In some embodiments, the aqueous solution may have a temperature equal to about a temperature of the aqueous solution used at act 102 to form the slurry, such as between about 50° C. and about 80° C. Accordingly, the treated aqueous solution may be recycled and used at act 102 without heating the treated aqueous solution to processing temperatures of the oil sand slurry. In other embodiments, the aqueous solution may free of environmental toxins and may be suitable to be deposited into the environment.

Compared to commercially available methods and materials that are used to enhance fines settling, the methods and functionalized nanoparticles 200 described herein increase the settling rate of tailings fines and coarse particles while simultaneously removing dissolved metals from the tailings. In some embodiments, a combination of one or more of poly diallyl dimethylammonium chloride or an anionic polyacrylamine flocculent with the functionalized nanoparticles 200 may exhibit an improved removal and settling of fines, coarse particles, and dissolved metals.

Additional nonlimiting example embodiments of the disclosure are described below.

Embodiment 1

A method of recovering fines and coarse particles from tailings formed during recovery of bitumen from oil sands, the method comprising: forming a slurry comprising water and oil sands; separating bitumen from tailings in at least one of a primary separation vessel or a secondary separation vessel, the tailings comprising a solution having fines and coarse particles suspended therein; mixing functionalized nanoparticles with the tailings, the functionalized nanoparticles each comprising a core of carbon nitride and functionalized with one or more exposed cationic groups; forming agglomerates comprising the functionalized nanoparticles and at least the fines attached to the one or more exposed cationic groups; and removing the agglomerates from the tailings to form an aqueous solution having suspended therein fewer fines and coarse particles than are suspended within the tailings.

Embodiment 2

The method of Embodiment 1, further comprising selecting the functionalized nanoparticles to comprise a colloidal suspension carbon nitride nanoparticles with one or more exposed cationic groups selected from the group consisting of an amine group, a guanidine group, a biguanidine group, an imidazole group, a pyrazole group, a pyridine group, a piperdine group, a pyrrolidine group, a morpholine group, a quinolone group, an isoquinolone group, an indole group, a thiazole group, a benzothiazole group, a quaternary ammonium group, a phosphonium group, a sulfonium group, a guanidinium group, a bi-guanidinium group, an imidazolium group, a pyrazolium group, a pyridinium group, a piperidinium group, a morpholinium group, a quinolinium group, an isoquinolinium group, an indolium group, a thiazolium group, a benzothiazonium group, a cyclopropenylium group, an amide group, a polyethyleneimide group, or combinations thereof.

Embodiment 3

The method of Embodiment 2, further comprising adding an acid to the colloidal suspension and reducing a pH of the colloidal suspension to between about 4.0 and about 6.0.

Embodiment 4

The method of any one of Embodiments 1 through 3, further comprising mixing poly diallyl dimethylammonium chloride with the tailings.

Embodiment 5

The method of Embodiment 4, wherein mixing the poly diallyl dimethylammonium chloride with the tailings comprises adding the poly diallyl dimethylammonium chloride to the tailings to achieve a concentration of between about 50 ppm and about 350 ppm of the poly diallyl dimethylammonium chloride in the tailings.

Embodiment 6

The method of Embodiment 4 or Embodiment 5, further comprising mixing the poly diallyl dimethylammonium chloride with the tailings after mixing the functionalized nanoparticles with the tailings.

Embodiment 7

The method of any one of Embodiments 1 through 6, further comprising recycling at least a portion of the aqueous solution to at least one of the slurry or the primary separation vessel.

Embodiment 8

The method of any one of Embodiments 1 through 7, wherein mixing functionalized nanoparticles with the tailings comprises reducing a zeta potential of the tailings to about 0.0 mV.

Embodiment 9

The method of any one of Embodiments 1 through 8, further comprising adding an anionic polyacrylamine flocculent to the tailings to achieve a concentration between about 50 ppm and about 350 ppm of the anionic polyacrylamine flocculent in the tailings.

Embodiment 10

The method of any one of Embodiments 1 through 9, further comprising selecting the one or more exposed cationic groups to comprise at least one amine group and one or more a guanidine group, a biguanidine group, an imidazole group, a pyrazole group, a pyridine group, a piperdine group, a pyrrolidine group, a morpholine group, a quinolone group, an isoquinolone group, an indole group, a thiazole group, a benzothiazole group, a quaternary ammonium group.

Embodiment 11

The method of any one of Embodiments 1 through 10, further comprising selecting the functionalized nanoparticles to exhibit a zeta potential having an absolute value equal to approximately an absolute value of a zeta potential of the fines.

Embodiment 12

The method of any one of Embodiments 1 through 11, wherein mixing functionalized nanoparticles with the tailings comprises binding dissolved metals dissolved in the tailings with functionalized nanoparticles comprising carbon nitride.

Embodiment 13

A method of removing fines from tailings, the method comprising: mixing functionalized nanoparticles each comprising at least one exposed functional group on surfaces of a carbon nitride core with tailings including negatively charged fine particles to form a mixture, the exposed functional group selected from the group consisting of an amine group, an ammonium group, a guanidinium group and derivatives thereof, a phosphonium group, and a sulfonium group; attaching the negatively charged fine particles to the at least one exposed functional group to form agglomerations of the fine particles attached to the functionalized nanoparticles, the agglomerations having a larger diameter than each of the negatively charged fine particles; and separating the agglomerations from the tailings to form a substantially clarified aqueous solution having fewer fines suspended therein than are suspended in the tailings.

Embodiment 14

The method of Embodiment 13, wherein mixing functionalized nanoparticles with tailings comprises mixing about one functionalized nanoparticle for about every two negatively charged fine particles in the tailings.

Embodiment 15

The method of Embodiment 13 or Embodiment 14, wherein forming agglomerations of the fine particles attached to the functionalized nanoparticles comprises forming agglomerations having a diameter at least about five times greater than a diameter of the negatively charged fine particles.

Embodiment 16

The method of any one of Embodiments 13 through 15, further comprising adding at least one of an anionic polyacrylamine flocculent or poly diallyl dimethylammonium chloride to the mixture.

Embodiment 17

The method of any one of Embodiments 13 through 16, further comprising adding functionalized silica nanoparticles to the mixture.

Embodiment 18

A method of separating fines and dissolved metals form tailings, the method comprising: forming a mixture comprising carbon nitride nanoparticles functionalized with one or more exposed cationic groups and tailings including a plurality of fines, coarse particles, and dissolved metals suspended therein; binding at least some of the dissolved metals with a core of the carbon nitride nanoparticles; attaching at least some of the fines of the plurality of fines to the one or more exposed cationic groups to form agglomerations of the carbon nitride nanoparticles, bound dissolved metals, and fines; and settling the agglomerations from the tailings to form an aqueous solution having fewer fines, coarse particles, and dissolved metals suspended therein than are suspended in the tailings.

Embodiment 19

The method of Embodiment 18, further comprising selecting the exposed cationic groups to comprise amine groups, ammonium groups, guanidinium groups and derivatives thereof, phosphonium groups, and sulfonium groups.

Embodiment 20

The method of Embodiment 18 or Embodiment 19, further comprising adding poly diallyl dimethylammonium chloride to the mixture.

While the disclosure is susceptible to various modifications and alternative forms, specific embodiments have been shown by way of example in the drawings and have been described in detail herein. However, the disclosure is not intended to be limited to the particular forms disclosed. Rather, the disclosure is to cover all modifications, equivalents, and alternatives falling within the scope of the disclosure as defined by the following appended claims and their legal equivalents.

What is claimed is:

1. A method of removing fines and coarse particles from tailings formed during recovery of bitumen from oil sands, the method comprising:
forming a slurry comprising water and oil sands;
separating bitumen from tailings in at least one of a primary separation vessel or a secondary separation vessel, the tailings comprising a solution having fines and coarse particles suspended therein;
mixing functionalized nanoparticles with the tailings, the functionalized nanoparticles each comprising a core of carbon nitride and functionalized with one or more exposed cationic groups;
forming agglomerates comprising the functionalized nanoparticles and at least the fines attached to the one or more exposed cationic groups; and
removing the agglomerates from the tailings to form an aqueous solution having suspended therein fewer fines and coarse particles than are suspended within the tailings.

2. The method of claim 1, further comprising selecting the functionalized nanoparticles to comprise a colloidal suspension carbon nitride nanoparticles with one or more exposed cationic groups selected from the group consisting of an amine group, a guanidine group, a bi-guanidine group, an imidazole group, a pyrazole group, a pyridine group, a piperdine group, a pyrrolidine group, a morpholine group, a quinolone group, an isoquinolone group, an indole group, a thiazole group, a benzothiazole group, a quaternary ammonium group, a phosphonium group, a sulfonium group, a guanidinium group, a bi-guanidinium group, an imidazolium group, a pyrazolium group, a pyridinium group, a piperidinium group, a morpholinium group, a quinolinium group, an isoquinolinium group, an indolium group, a thiazolium group, a benzothiazonium group, a cyclopropenylium group, an amide group, a polyethyleneimide group, and combinations thereof.

3. The method of claim 2, further comprising adding an acid to the colloidal suspension and reducing a pH of the colloidal suspension to between about 4.0 and about 6.0.

4. The method of claim 1, further comprising mixing poly diallyl dimethylammonium chloride with the tailings.

5. The method of claim 4, wherein mixing the poly diallyl dimethylammonium chloride with the tailings comprises adding the poly diallyl dimethylammonium chloride to the tailings to achieve a concentration of between about 50 ppm and about 350 ppm of the poly diallyl dimethylammonium chloride in the tailings.

6. The method of claim 4, further comprising mixing the poly diallyl dimethylammonium chloride with the tailings after mixing the functionalized nanoparticles with the tailings.

7. The method of claim 1, further comprising recycling at least a portion of the aqueous solution to at least one of the slurry or the primary separation vessel.

8. The method of claim 1, wherein mixing functionalized nanoparticles with the tailings comprises reducing a zeta potential of the tailings to about 0.0 mV.

9. The method of claim 1, further comprising adding an anionic polyacrylamine flocculent to the tailings to achieve a concentration between about 50 ppm and about 350 ppm of the anionic polyacrylamine flocculent in the tailings.

10. The method of claim 1, further comprising selecting the one or more exposed cationic groups to comprise at least one amine group and one or more of a guanidine group, a biguanidine group, an imidazole group, a pyrazole group, a pyridine group, a piperdine group, a pyrrolidine group, a morpholine group, a quinolone group, an isoquinolone group, an indole group, a thiazole group, a benzothiazole group, or a quaternary ammonium group.

11. The method of claim 1, further comprising selecting the functionalized nanoparticles to exhibit a zeta potential having an absolute value equal to approximately an absolute value of a zeta potential of the fines.

12. The method of claim 1, wherein mixing functionalized nanoparticles with the tailings comprises binding dissolved metals dissolved in the tailings with functionalized nanoparticles comprising carbon nitride.

13. A method of removing fines from tailings, the method comprising:
mixing functionalized nanoparticles each comprising at least one exposed functional group on surfaces of a carbon nitride core with tailings including negatively charged fine particles to form a mixture, the exposed functional group selected from the group consisting of an amine group, an ammonium group, a guanidinium group and derivatives thereof, a phosphonium group, and a sulfonium group;
attaching the negatively charged fine particles to the at least one exposed functional group to form agglomerations of the fine particles attached to the functionalized nanoparticles, the agglomerations having a larger diameter than each of the negatively charged fine particles; and
separating the agglomerations from the tailings to form a substantially clarified aqueous solution having fewer fines suspended therein than are suspended in the tailings.

14. The method of claim 13, wherein mixing functionalized nanoparticles with tailings comprises mixing about one functionalized nanoparticle for about every two negatively charged fine particles in the tailings.

15. The method of claim 13, wherein forming agglomerations of the fine particles attached to the functionalized nanoparticles comprises forming agglomerations having a diameter at least about five times greater than a diameter of the negatively charged fine particles.

16. The method of claim 13, further comprising adding at least one of an anionic polyacrylamine flocculent or poly diallyl dimethylammonium chloride to the mixture.

17. The method of claim 13, further comprising adding functionalized silica nanoparticles to the mixture.

18. A method of separating fines and dissolved metals from tailings, the method comprising:
forming a mixture comprising carbon nitride nanoparticles functionalized with one or more exposed cationic groups and tailings including a plurality of fines, coarse particles, and dissolved metals suspended therein;
binding at least some of the dissolved metals with a core of the carbon nitride nanoparticles;
attaching at least some of the fines of the plurality of fines to the one or more exposed cationic groups to form agglomerations of the carbon nitride nanoparticles, bound dissolved metals, and fines; and
settling the agglomerations from the tailings to form an aqueous solution having fewer fines, coarse particles, and dissolved metals suspended therein than are suspended in the tailings.

19. The method of claim 18, further comprising selecting the exposed cationic groups to comprise amine groups, ammonium groups, guanidinium groups and derivatives thereof, phosphonium groups, or sulfonium groups.

20. The method of claim 19, further comprising adding poly diallyl dimethylammonium chloride to the mixture.

* * * * *

UNITED STATES PATENT AND TRADEMARK OFFICE
CERTIFICATE OF CORRECTION

PATENT NO. : 9,856,158 B2  
APPLICATION NO. : 15/002130  
DATED : January 2, 2018  
INVENTOR(S) : Oleg A. Mazyar et al.

It is certified that error appears in the above-identified patent and that said Letters Patent is hereby corrected as shown below:

In the Specification

Column 3, Line 10, change "about 1 jam, such" to --about 1 µm, such--  
Column 6, Line 51, change "chromium ($Cr^+$, $Cr^{3+}$)," to --chromium ($Cr^{2+}$, $Cr^{3+}$),--

Signed and Sealed this  
Twenty-sixth Day of June, 2018

Andrei Iancu  
*Director of the United States Patent and Trademark Office*